(12) United States Patent
Wang

(10) Patent No.: US 12,389,838 B1
(45) Date of Patent: Aug. 19, 2025

(54) TYPE OF PLANT CULTIVATION DEVICE

(71) Applicant: Liuzeng Wang, Shenzhen (CN)

(72) Inventor: Liuzeng Wang, Shenzhen (CN)

( * ) Notice: Subject to any disclaimer, the term of this patent is extended or adjusted under 35 U.S.C. 154(b) by 0 days.

(21) Appl. No.: 18/438,524

(22) Filed: Feb. 12, 2024

(51) Int. Cl.
*A01G 9/24* (2006.01)
*A01G 9/02* (2018.01)
*A01G 9/26* (2006.01)

(52) U.S. Cl.
CPC ............ *A01G 9/249* (2019.05); *A01G 9/028* (2013.01); *A01G 9/26* (2013.01)

(58) Field of Classification Search
CPC . A01G 9/249; A01G 9/24; A01G 9/14; A01G 31/00; A01G 31/02; A01G 31/06; A01G 9/16; A01G 9/26; A01C 1/02
See application file for complete search history.

(56) References Cited

U.S. PATENT DOCUMENTS

| | | | | |
|---|---|---|---|---|
| 3,106,801 A * | 10/1963 | Risacher | ............ | A01G 9/16 219/385 |
| 3,673,733 A * | 7/1972 | Allen | ............ | A01G 9/246 165/47 |
| 4,291,494 A * | 9/1981 | Knablein | ............ | A01G 9/16 47/87 |
| 10,531,618 B2 * | 1/2020 | Marshall | ............ | A01G 31/02 |
| 11,039,585 B1 * | 6/2021 | Huntzinger | ............ | A01G 31/06 |
| 2009/0025287 A1 * | 1/2009 | Lee | ............ | A01G 9/246 47/17 |
| 2014/0208642 A1 * | 7/2014 | Henman | ............ | A01G 9/00 47/19.2 |
| 2014/0318006 A1 * | 10/2014 | Sutherland | ............ | A01G 9/16 47/17 |
| 2016/0360711 A1 * | 12/2016 | Vesty | ............ | A01G 31/047 |
| 2018/0325055 A1 * | 11/2018 | Krakover | ............ | A01G 31/06 |
| 2021/0235633 A1 * | 8/2021 | Marshall | ............ | A01G 9/029 |
| 2021/0289716 A1 * | 9/2021 | Lokdarshi | ............ | A01G 9/249 |

FOREIGN PATENT DOCUMENTS

| | | | | |
|---|---|---|---|---|
| CA | 2814304 A1 * | 10/2014 | ............ | A01G 9/16 |
| CA | 3003437 A1 * | 7/2018 | ............ | A01G 13/04 |
| GB | 2328854 A * | 3/1999 | ............ | A01G 9/16 |

* cited by examiner

*Primary Examiner* — Kristen C Hayes
(74) *Attorney, Agent, or Firm* — Addison D. Ault; IPGentleman Intellectual Property Services, LLC

(57) ABSTRACT

A new type of plant cultivation device, which includes a cultivation component and a plant lamp; and the cultivation component includes a planting tray and an insulation cover, where the planting tray has multiple cultivation chambers, the multiple cultivation chambers are arranged in an array, the insulation cover is covered above the planting tray, and encloses and seals the planting tray, where the insulation cover also has at least one mounting seat, the mounting seat can receive and support the plant lamp; and the plant lamp is configured to provide simulated sunlight for the plants in the multiple cultivation chambers, promoting plant growth.

18 Claims, 14 Drawing Sheets

TYPE OF PLANT CULTIVATION DEVICE

TECHNICAL FIELD

The present invention relates to the technical field of plant cultivation, in particular to a new type of plant cultivation device.

BACKGROUND

Currently, the hydroponic method of plant cultivation mainly relies on nutrient solution to cultivate plants. The existing plant cultivation devices only simply have the function of placing plants and nutrient solution. In the process of use, the cultivator cannot take care of the plants for a long time and cannot provide sufficient nutrition and comfortable conditions in time, which results in plant damage and poor cultivation effect, or even death.

The U.S. patent with application Ser. No. 10/531,618 discloses a plant cultivation device. This device provides convenient control of air circulation and the level of liquid nutrient solution, so that plants can achieve optimal growth under controlled conditions. However, the cultivation temperature of this device changes with the actual temperature, and it cannot provide a comfortable cultivation temperature for plants.

The U.S. patent with application Ser. No. 12/597,117 discloses a device for germination or growth and a plant cultivation device. This device can increase the concentration of carbon dioxide in the insulation chamber and control the cultivation temperature of the device to promote plant growth.

Therefore, a new plant cultivation device is now provided. This device can control the cultivation temperature in the cultivation device through a new technology. At the same time, the device can also provide plants with comfortable sunlight, humidity and other natural factors required for growth, thereby promoting plant cultivation and enabling plants to achieve optimal growth under controlled regulation.

SUMMARY

The present invention provides a new type of plant cultivation device, comprising a cultivation component and a plant lamp; and
  wherein the cultivation component includes a planting tray and an insulation cover, wherein the planting tray has multiple cultivation chambers, multiple the cultivation chambers are arranged in an array, the insulation cover is covered above the planting tray, and encloses and seals the planting tray, wherein the insulation cover also has at least one mounting seat, the mounting seat can receive and support the plant lamp; and
  wherein the plant lamp is configured to provide simulated sunlight for the plants in multiple the cultivation chambers, promoting plant growth.

The present invention also provides a new type of plant cultivation device, comprising a temperature control device and a cultivation component; and
  wherein the temperature control device includes a heating component and a control component; and
  wherein the cultivation component includes a planting tray and an insulation cover, wherein the planting tray has multiple cultivation chambers, multiple the cultivation chambers are arranged in an array, the insulation cover is covered above the planting tray, and encloses and seals the planting tray, wherein the insulation cover also has at least one ventilation hole, the insulation cover provides fresh air for the plants in multiple the cultivation chambers through the ventilation hole; and
  wherein the user uses the control component to control the operation of the heating component, basing on the temperature value of the environment; and
  wherein the temperature control device is thermally connected with the soil in multiple the cultivation chambers.

The present invention also provides a new type of plant cultivation device, comprising a temperature control device, a cultivation component, a measuring device, and a plant lamp; and
  wherein the temperature control device includes a heating component and a control component; and
  wherein the cultivation component includes a planting tray and an insulation cover, wherein the planting tray has multiple cultivation chambers, multiple the cultivation chambers are arranged in an array, the insulation cover is covered above the planting tray, and encloses and seals the planting tray, wherein the insulation cover also has at least one mounting seat, the mounting seat can receive and support the plant lamp; and
  wherein the measuring device includes at least one probe, the probe extends into the soil of the cultivation chamber to obtain the temperature value and humidity value of the soil; and wherein the user uses the control component to control the operation of the heating component, basing on the temperature value and the humidity value; and
  wherein the temperature control device is thermally connected with the soil.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
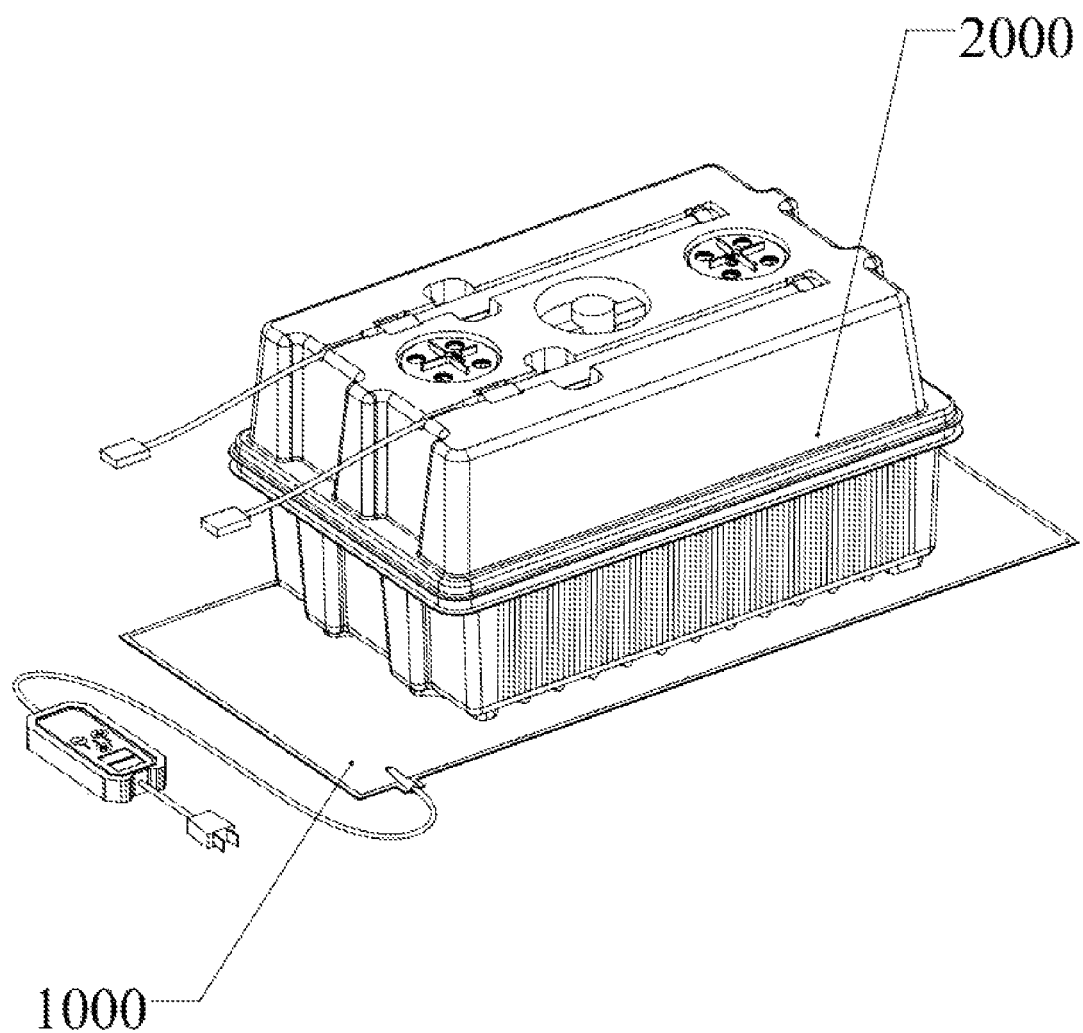
FIG. 1 is a schematic diagram of the plant cultivation device in this patent application.

temperature control device (1000); heating component (1100); control component (1200); control switch (1210); display screen (1220); cultivation component (2000); planting tray (2100); cultivation chamber (2110); first cavity (2111); drainage hole (2112); lower shell (2120); anti-slip block (2121); protruding part (2122); recessed hole (2123); insulation cover (2130); second cavity (2131); water-absorbing cotton (2140); bracket (2150); support leg (2151); circular mounting seat (2160); fixed hole (2161); lifting part (2162); circular lamp (2170); fixed buckle (2171); outer shell (2172); ventilation hole (2173); accommodation slot (2174); handle (2175); lamp board (2200); light source (2210); charging port (2220); tubular lamp (2230); tubular mounting seat (2240); card block (2250); power interface (2260); measuring device (3000); probe (3100); numerical screen (3200).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of this invention application, this invention application provides a new type of plant cultivation device. This device uses a new technology to control the cultivation temperature in the cultivation device. At the same time, the device can also provide plants with comfortable sunlight, humidity, and other natural factors needed for growth, thereby promoting plant cultivation, and enabling plants to achieve optimal growth under controlled regulation.

Figure 2:
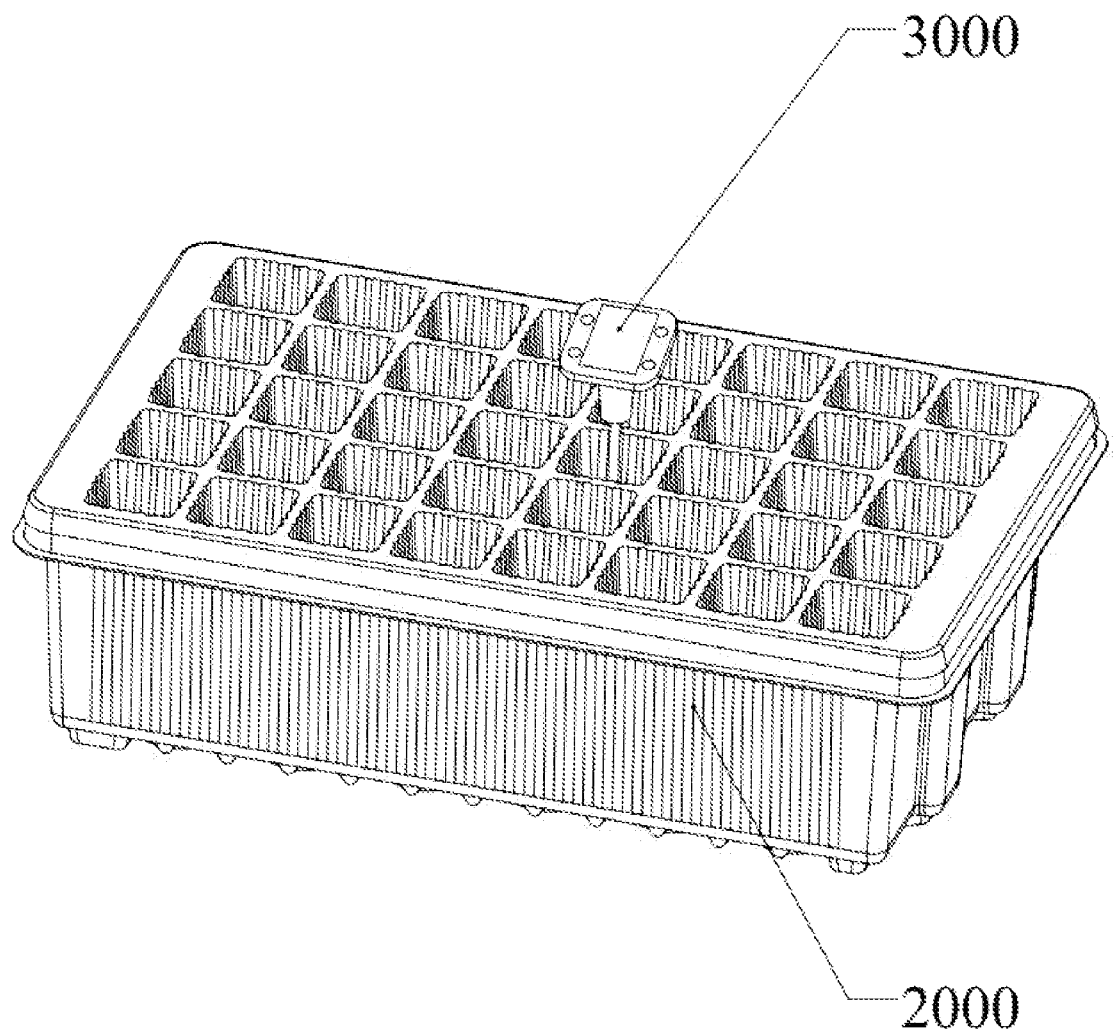
FIG. 2 is a schematic diagram of the plant cultivation device in this patent application.

Refer to FIG. 1 and FIG. 2, the new plant cultivation device includes a temperature control device 1000, a cultivation component 2000, and a measuring device 3000.

Figure 3:
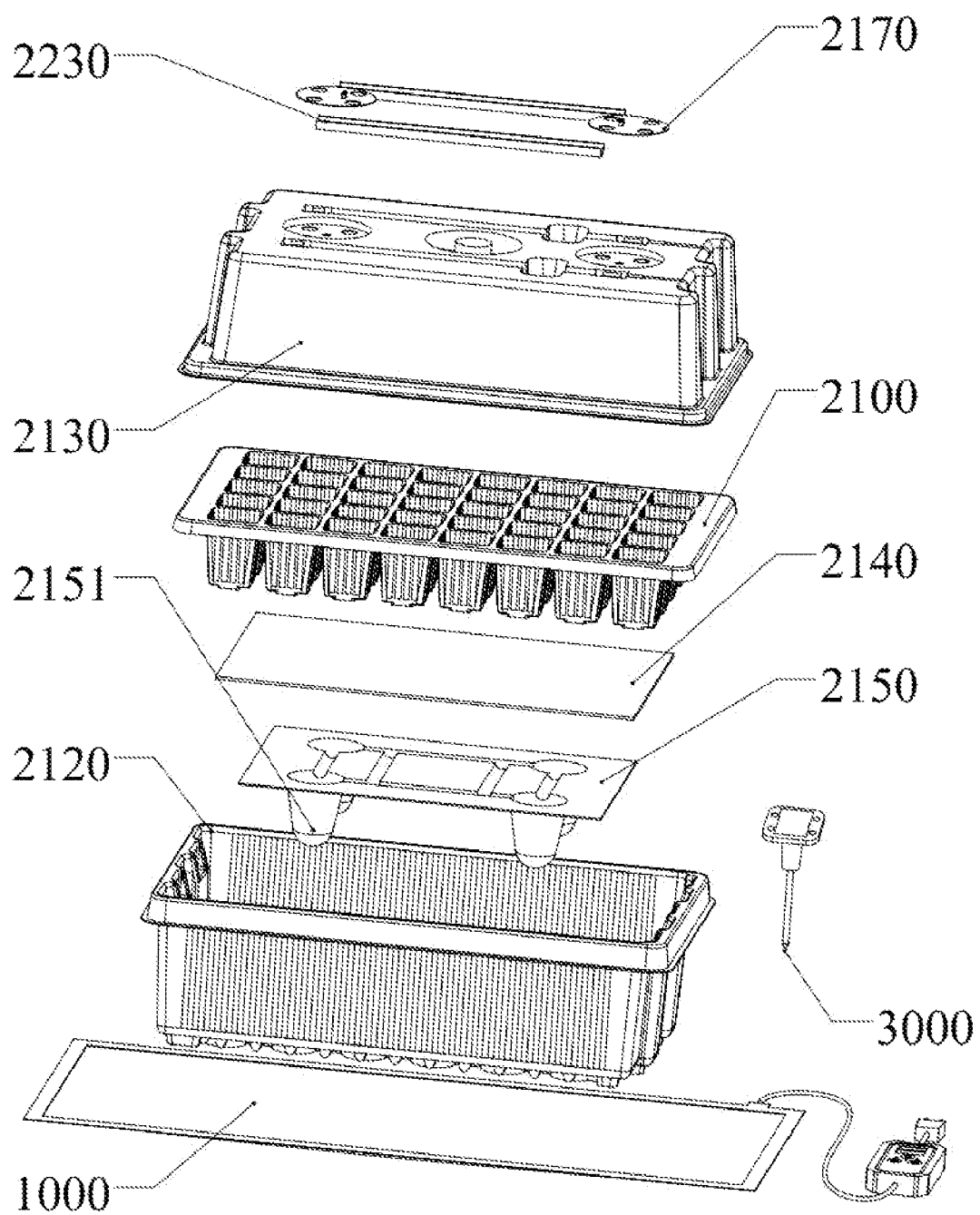
FIG. 3 is an exploded view of the plant cultivation device in this patent application.
Figure 4:
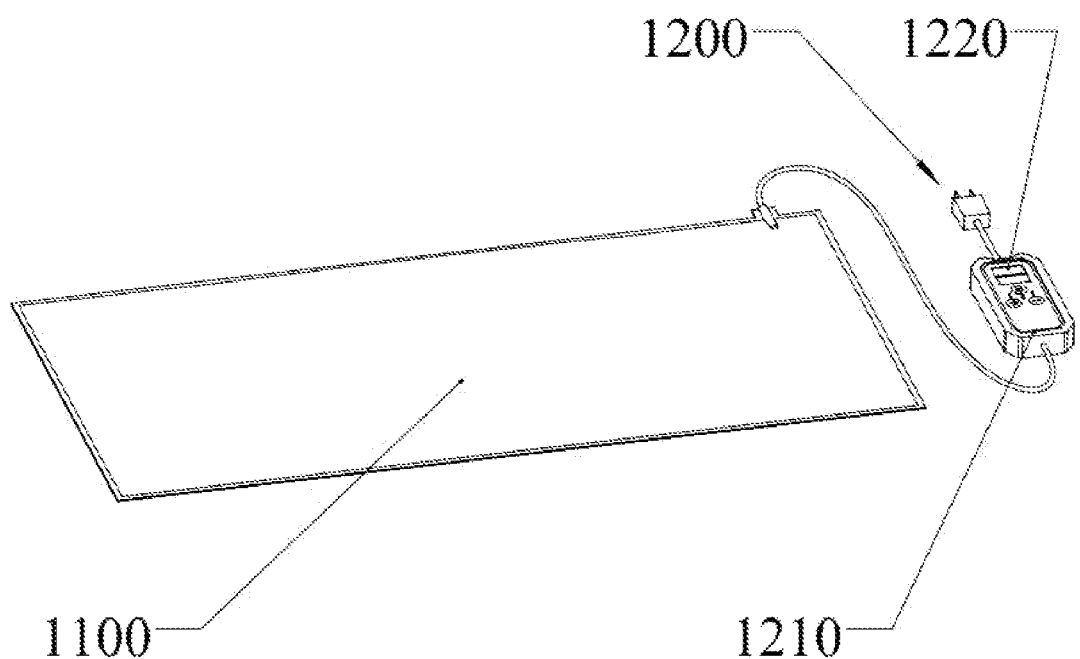
FIG. 4 is a schematic diagram of the temperature control device in this patent application.

Refer to FIG. 3, the temperature control device 1000 includes a heating component 1100 and a control component 1200. The heating component 1100 is rectangular in structure as a whole, and the outer layer is wrapped with a layer of waterproof material. The heating component 1100 can have waterproof and heating functions. The heating component 1100 is connected to the control component 1200 through a wire, and the heating component 1100 is electrically connected with the control component 1200. The temperature of the heating component 1100 is regulated through the control component 1200.

In other embodiments (not shown in the figure), the shape of the heating component 1100 is not limited to a rectangular structure, it can also be a circular structure, or an elliptical structure, or a diamond structure, or a cylindrical structure, or other irregular shapes and curved shapes.

Furthermore, the control component 1200 includes a control switch 1210. The control switch 1210 is a button switch. A display screen 1220 is set on the control switch 1210. The temperature value of the heating component 1100 can be obtained through the display screen 1220. In this embodiment, the control switch 1210 is a wired switch. The heating component 1100 and the control switch 1210 are two components connected by wires. At least one wired communication channel is set between the heating component 1100 and the control switch 1210. The wired communication channel includes but is not limited to Ethernet, or USB protocol, it can also be HDMI protocol, or RS-232C protocol, or RS485 protocol and other wired communication channels. In another embodiment (not shown in the figure), the control switch 1210 can be directly set on the heating component 1100, and at the same time, the heating component 1100 and the control switch 1210 can also communicate wirelessly, such as: Wi-Fi, or Bluetooth, it can also be RFID, or NFC.

In other embodiments (not shown in the figure), the control switch can include physical buttons, such as: joysticks, dials, sliding switches, touch switches, toggle switches and joysticks, click wheels, etc. In some alternative embodiments (not shown in the figure), the control method can be coupled to any of the following (or not coupled): keyboard, infrared port, USB port, and pointing device, such as a mouse. In some embodiments (not shown in the figure), the control method can also be an electronic device, such as a touch screen, computer device, and other control system devices.

Figure 5:
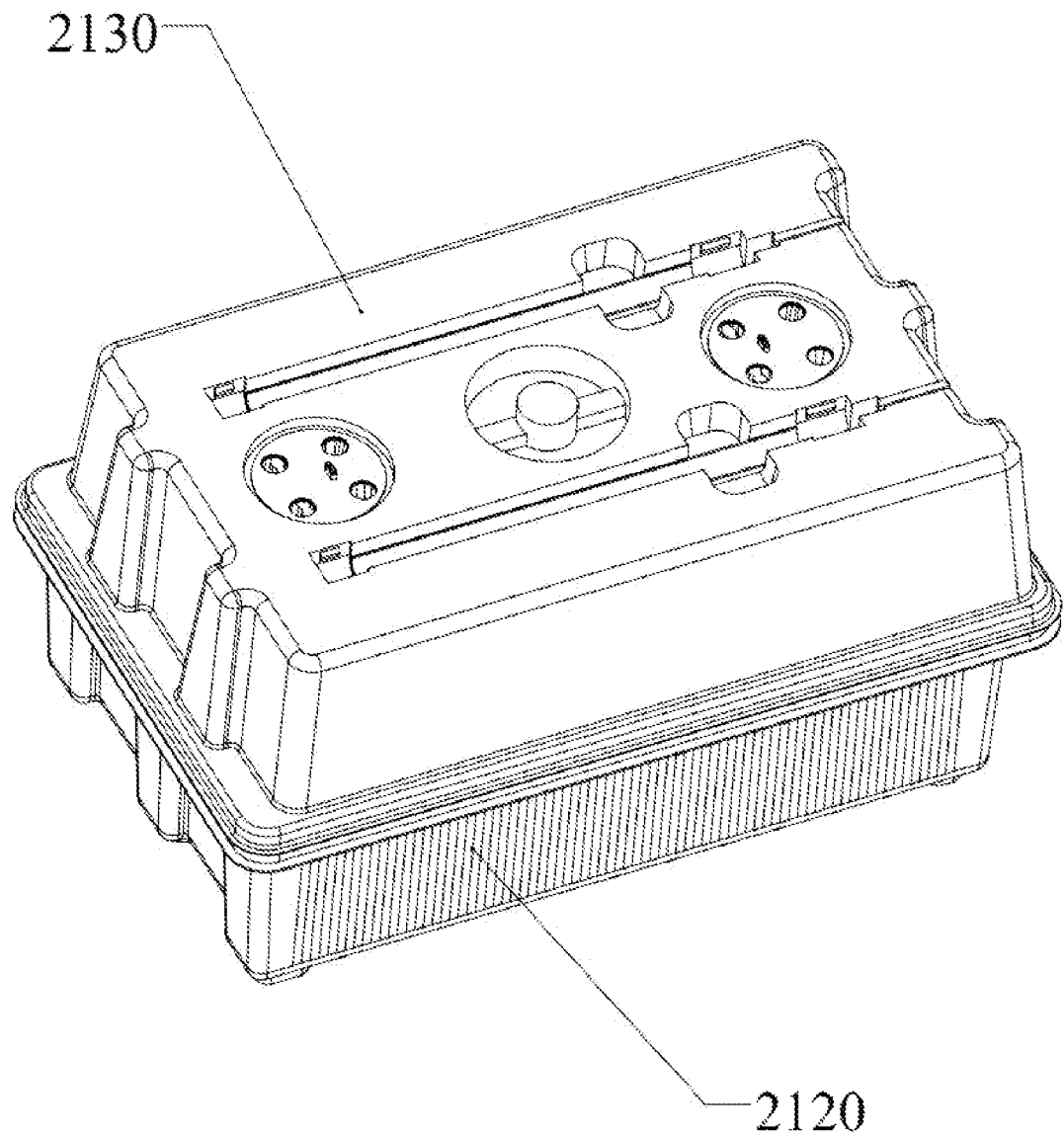
FIG. 5 is a schematic diagram of the cultivation component in this patent application.
Figure 6:
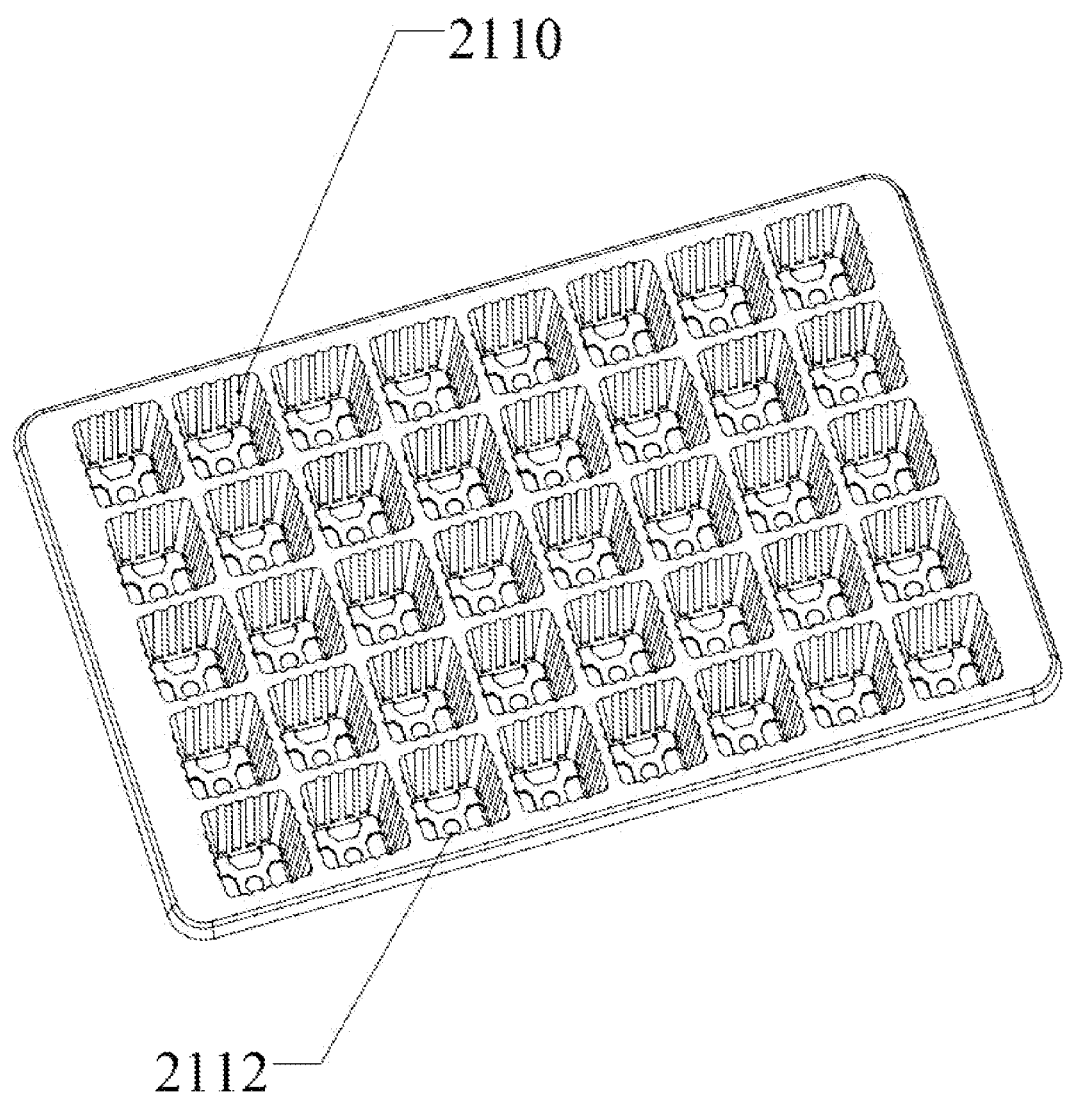
FIG. 6 is a schematic diagram of the planting tray in this patent application.

Refer to FIG. 5 and FIG. 6, the cultivation component 2000 includes a planting tray 2100 and a box.

Figure 7:
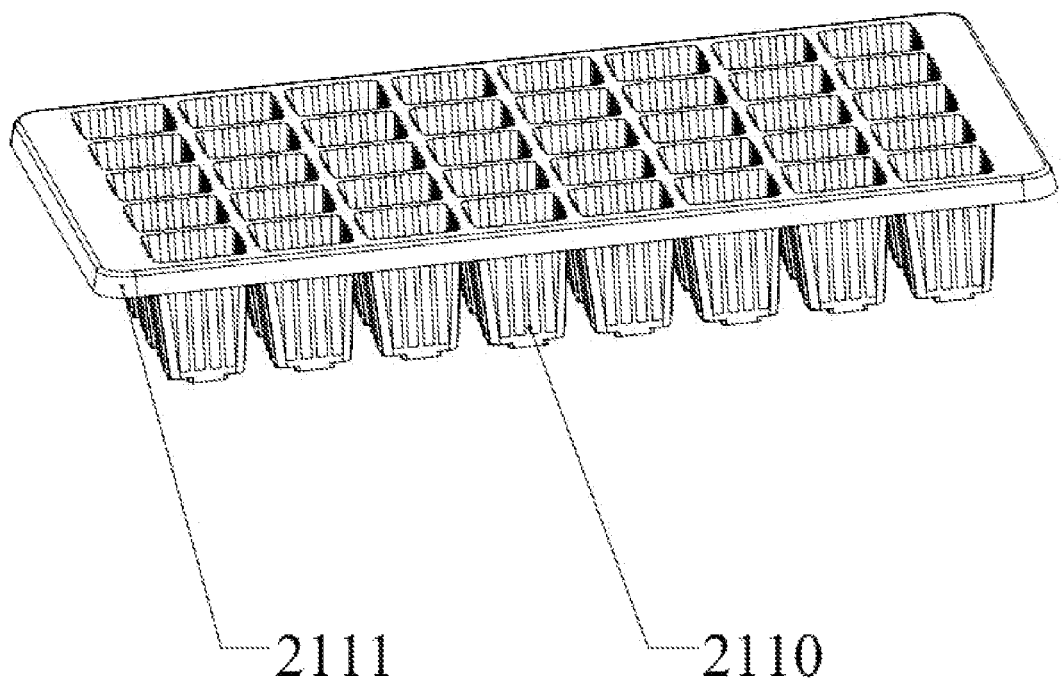
FIG. 7 is a schematic diagram of the planting tray in this patent application.

Refer to FIG. 6 and FIG. 7, the planting tray 2100 has multiple cultivation chambers 2110, and multiple cultivation chambers 2110 are arranged in a linear array. The bottom of any one of the multiple cultivation chambers 2110 is provided with a drainage hole 2112. Excess water from irrigation in the cultivation chamber 2110 can be drained out of the cultivation chamber 2110 through the drainage hole 2112. The array distribution is to accurately replicate one or more shape features, and this object can be placed and arranged according to personal wishes based on the settings of the number of rows, columns, and center points. In other embodiments (not shown in the figure), the cultivation chamber 2110 can also be arranged in a circular array. Circular array distribution is a special array method, which can evenly distribute multiple objects on a circle.

Figure 8:
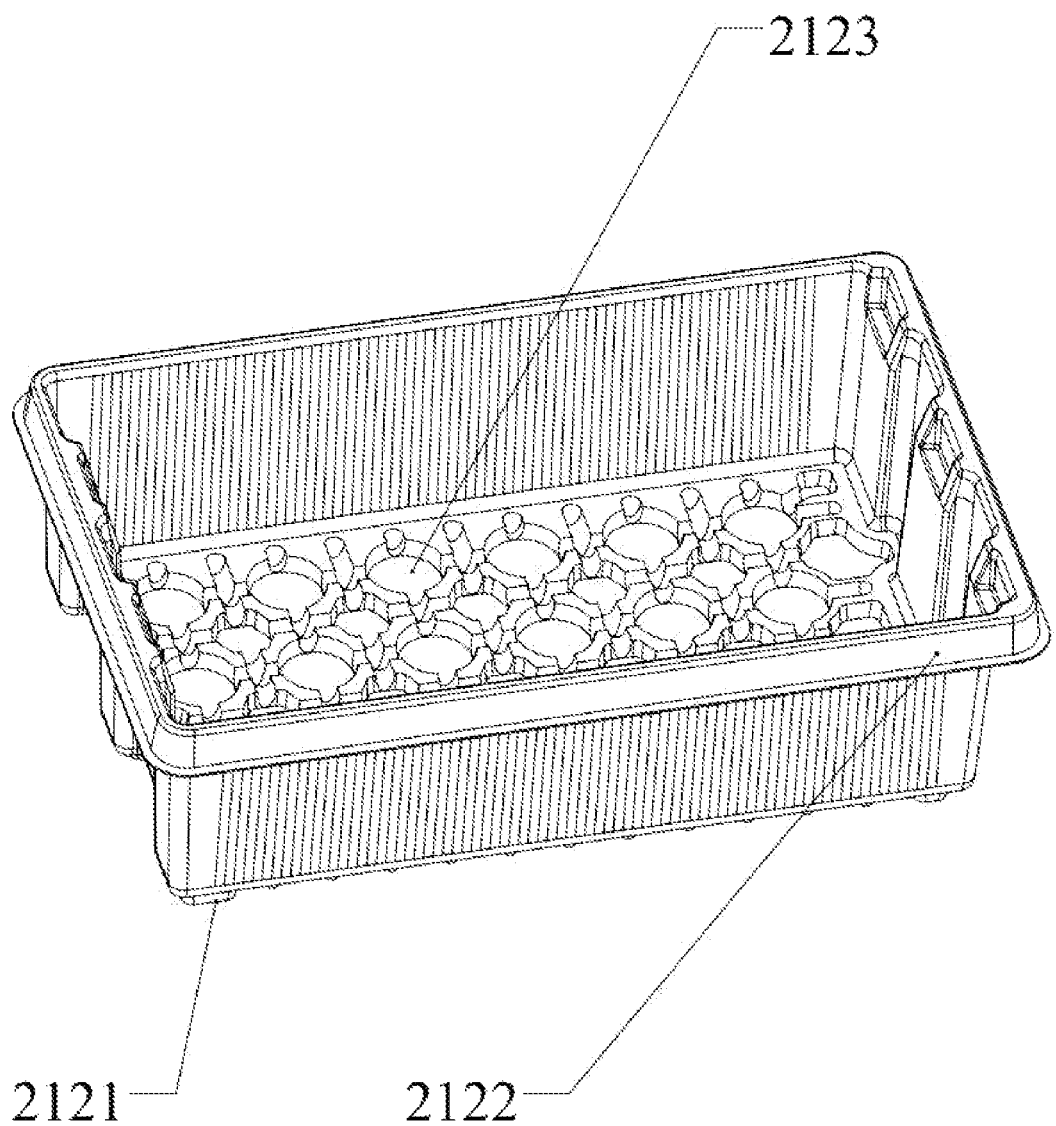
FIG. 8 is a schematic diagram of the lower shell in this patent application.

Further, referring to FIGS. 5 and 8, the box of the cultivation component 2000 includes a lower shell 2120 and an insulation cover 2130. In this invention application, the bottom of the lower shell 2120 is set with multiple anti-slip blocks 2121, the anti-slip blocks 2121 are in contact with the heating component 1100, the anti-slip blocks 2121 can stably fix the box on the heating component 1100, the lower shell 2120 and the insulation cover 2130 are detachably connected by a buckle.

Further, referring to FIG. 7 and FIG. 8, the lower shell 2120 is provided with a protruding part 2122, the protruding part 2122 is distributed around the lower shell 2120, the edge of the planting tray 2100 bends downwards to form a first cavity 2111, the shape of the first cavity 2111 matches the protruding part 2122, the two can be joined together, so that the planting tray 2100 is accommodated inside the lower shell 2120.

Referring to FIG. 8, the lower shell 2120 has an accommodation depth, the accommodation depth is the height of the accommodation space of the lower shell 2120. The accommodation depth is greater than the height of the planting tray 2100, so that when the planting tray 2100 is fixed on the lower shell 2120, it will not contact the bottom of the lower shell 2120, so that excess water can have space to drain.

Referring to FIG. 3, a water-absorbing cotton 2140 is set below the planting tray 2100, the water-absorbing cotton 2140 is supported by a bracket 2150, the bracket 2150 is in contact with the lower shell 2120, and further supports the planting tray 2100.

Referring to FIG. 3 and FIG. 8, the bottom of the lower shell 2120 has a circular recessed hole 2123, the bracket 2150 has four support legs 2151, the four support legs 2151 extend downwards and gradually reduce, the overall shape is a combination of a frustum and a sphere, the bottom shape of the support leg 2151 matches the recessed hole 2123, so that the four support legs 2151 are fixed in the recessed hole 2123.

In other embodiments (not shown in the figure), the number of support legs 2151 can also be one, or two, or multiple, or other quantity characteristics.

Figure 9:
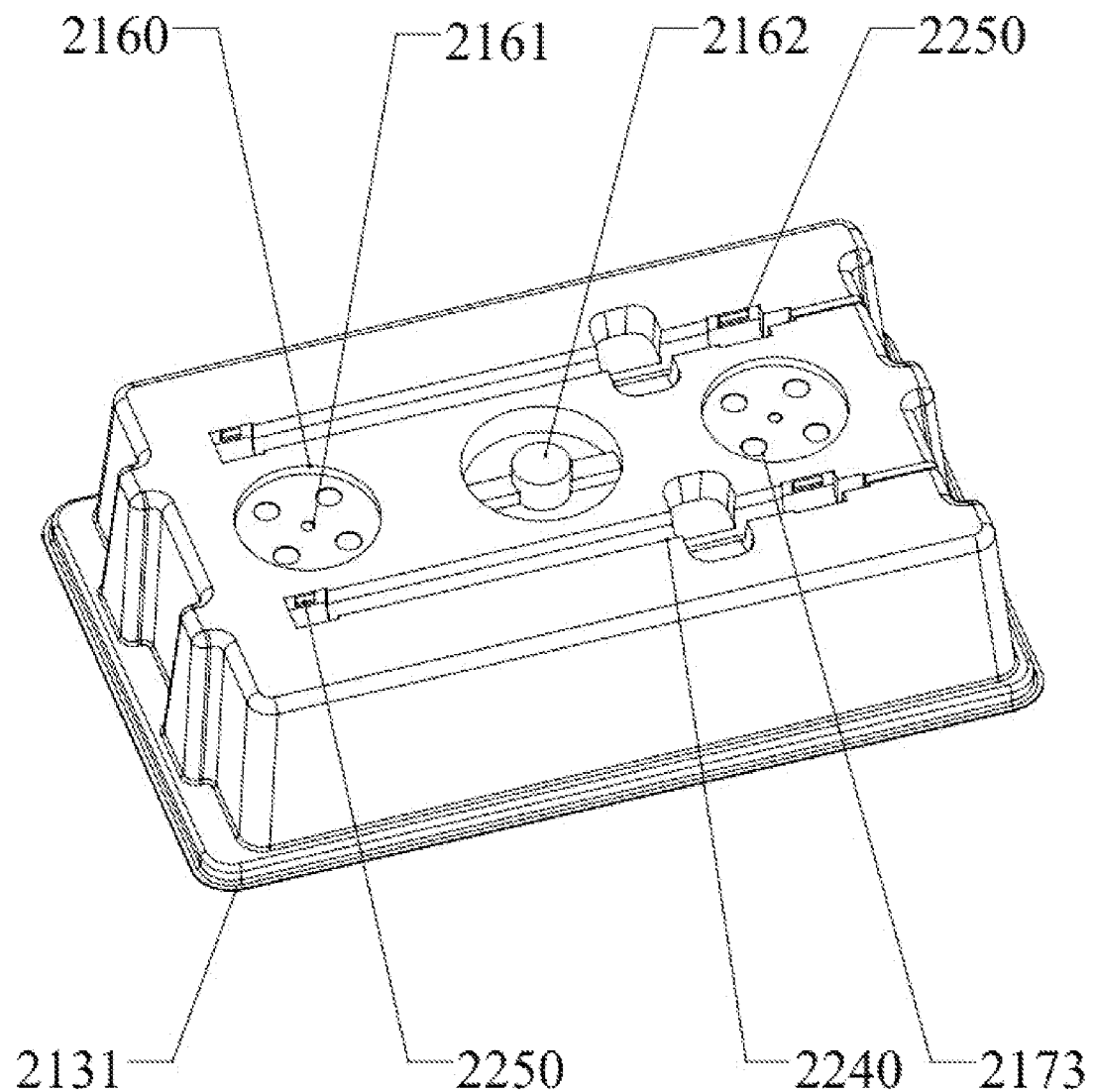
FIG. 9 is a schematic diagram of the insulation cover in this patent application.

Referring to FIG. 9, the edge of the insulation cover 2130 bends downwards to form a second cavity 2131, the size of the insulation cover 2130 is larger than the size of the planting tray 2100, so that the insulation cover 2130 can cover above the planting tray 2100, the size of the second cavity 2131 is also larger than the first cavity 2111, the shape of the first cavity 2111 and the second cavity 2131 match, the first cavity 2111 overlaps with the second cavity 2131, so that the insulation cover 2130 is covered on the planting tray 2100.

Figure 13:
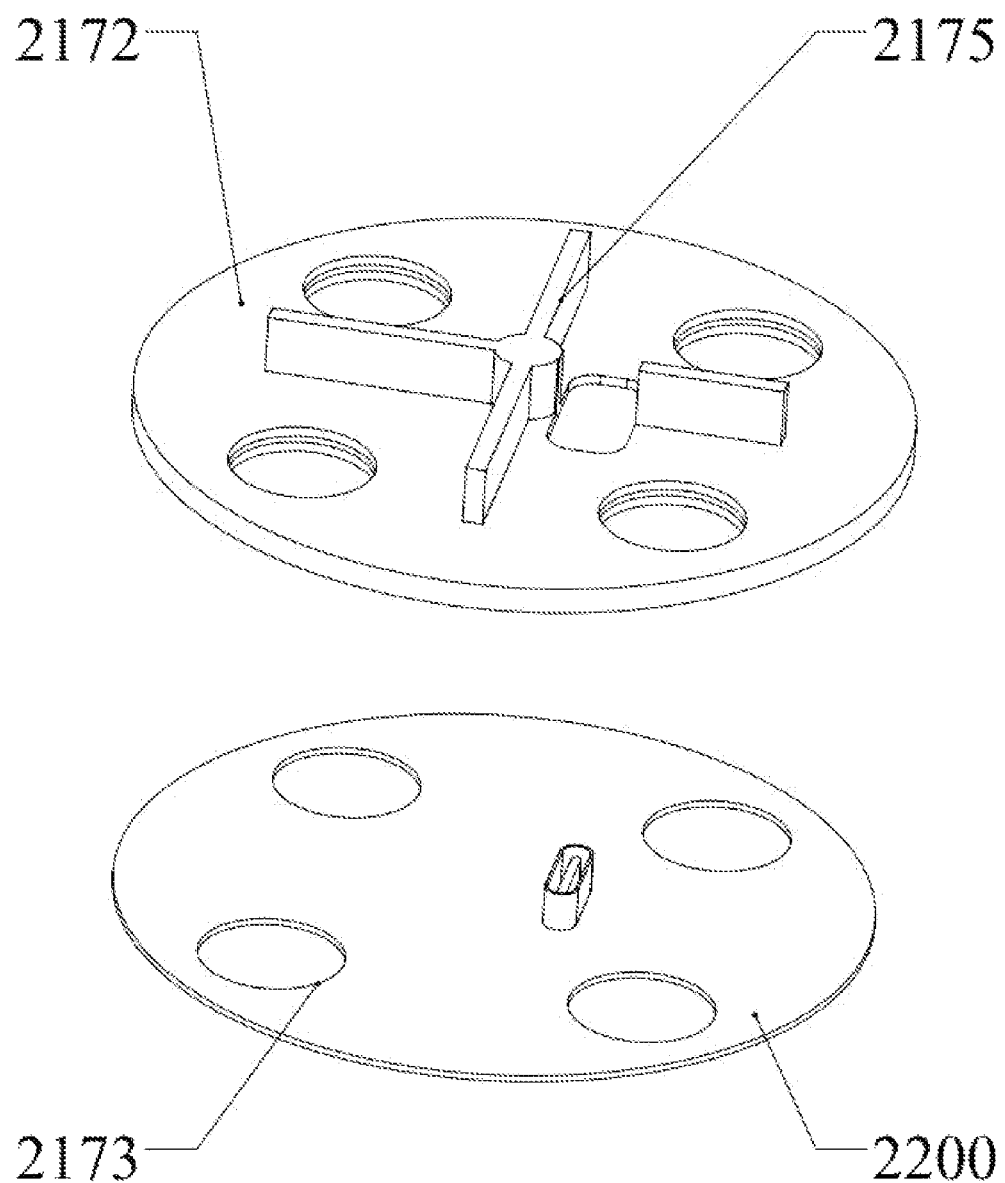
FIG. 13 is an exploded view of the circular lamp in this patent application.
Figure 14:
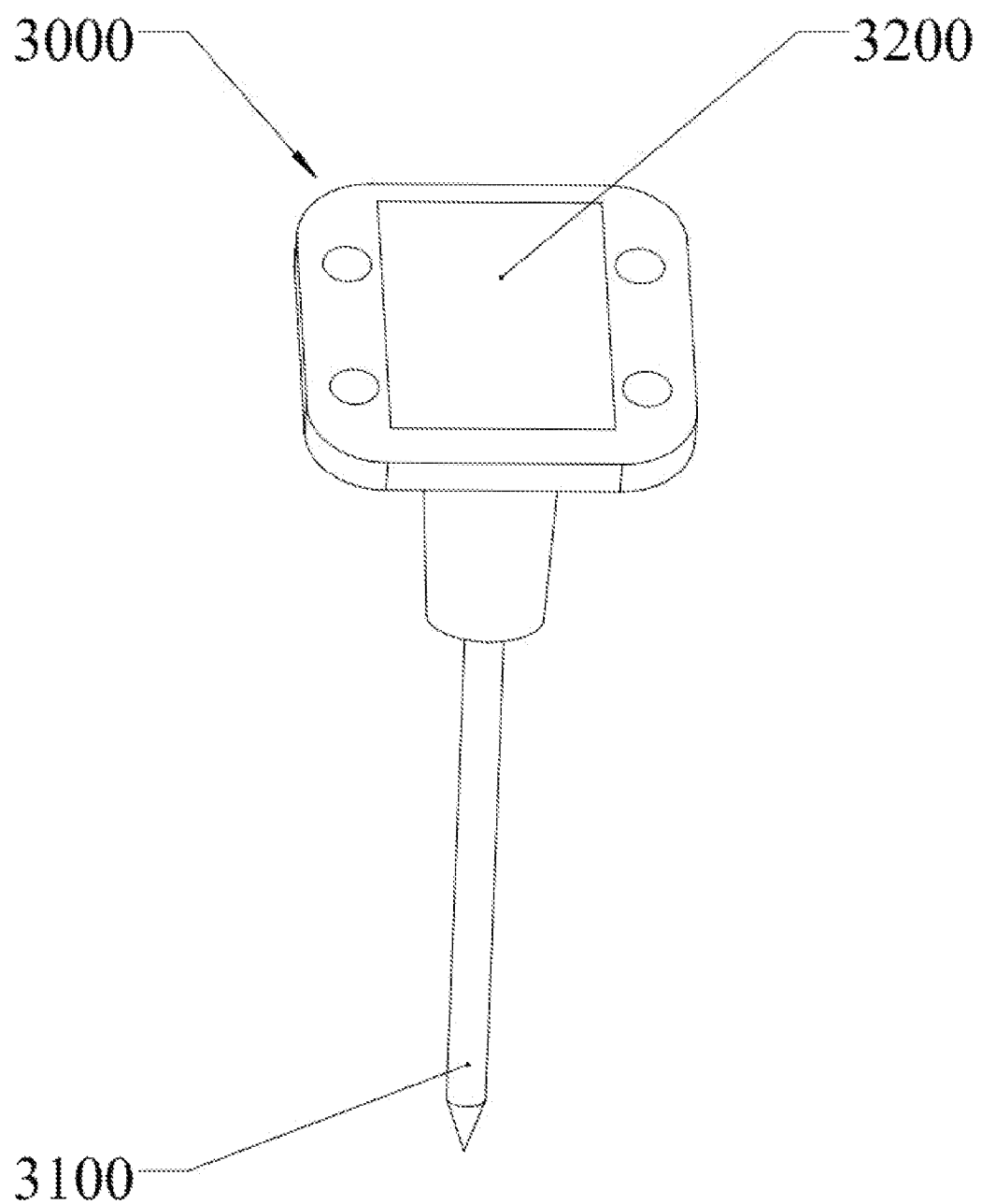
FIG. 14 is a schematic diagram of the measuring device in this patent application.

Referring to FIG. 13, the measuring device 3000 includes at least one probe 3100. When using the measuring device 3000, the probe 3100 extends into the soil of the cultivation chamber 2110 to obtain the temperature value of the soil. After obtaining the specific temperature value, the user controls the operation of the heating component 1100 using the control component 1200 based on the temperature value. The temperature control device 1000 is thermally connected with the soil. In other embodiments (not shown in the figure), the probe 3100 can also be set outside the cultivation chamber 2110 to directly measure the environmental temperature, the user can adjust the temperature of the heating component 1100 according to the environmental temperature, to provide the best growth temperature for plants.

Thermal connection is the heat exchange between the temperature control device 1000 and the soil. It involves transferring the heat of the temperature control device 1000 to the soil. This heat exchange can be carried out through conduction, convection, or radiation. The specific operation includes placing the temperature control device 1000 in the soil for heat exchange. The temperature control device 1000 can heat the soil as needed to reach a predetermined temperature. The process of thermal connection involves some processes such as heat conduction, heat convection, and heat radiation.

Referring to FIG. 9, as another preferred embodiment of this invention application, on the basis of the aforementioned new plant cultivation device, the device also adds the function of providing imitation sunlight. Among them, the insulation cover 2130 is covered above the planting tray 2100 and encloses and seals the planting tray 2100. The insulation cover 2130 also has four mounting seats, the mounting seats can receive and support the plant lamp.

The number of mounting seats is four, among them, the four mounting seats are two circular mounting seats 2160 and two tubular mounting seats 2240 respectively, the plant lamp includes circular lamps 2170 and tubular lamps 2230, the number of circular lamps 2170 and tubular lamps 2230 are also four each, both the two circular mounting seats 2160 and the two tubular mounting seats 2240 support the plant lamp through a fixed buckle.

In other embodiments (not shown in the figure), the number of mounting seats and plant lamps can also be one, or two, or multiple, or other quantity characteristics. As long as the number of mounting seats and plant lamps match.

Figure 10:
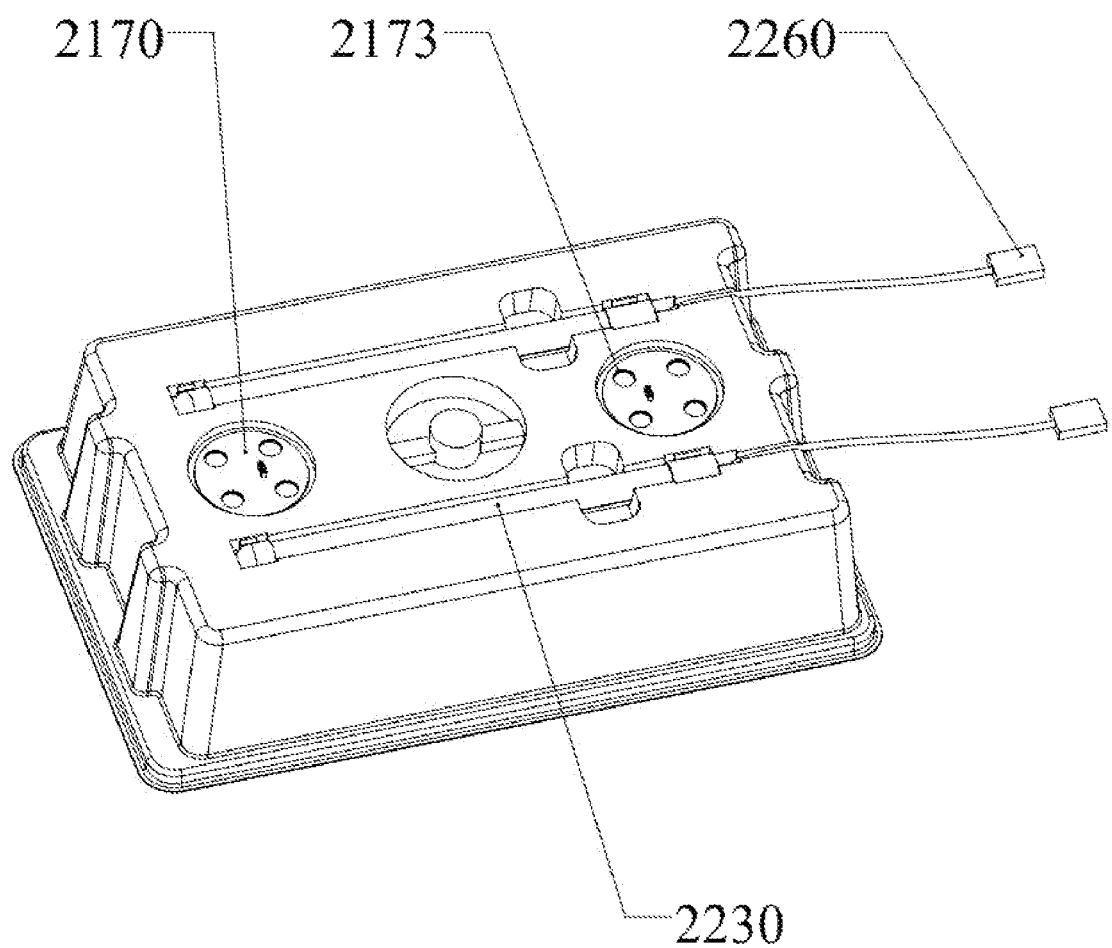
FIG. 10 is a schematic diagram of the insulation cover in this patent application.
Figure 11:
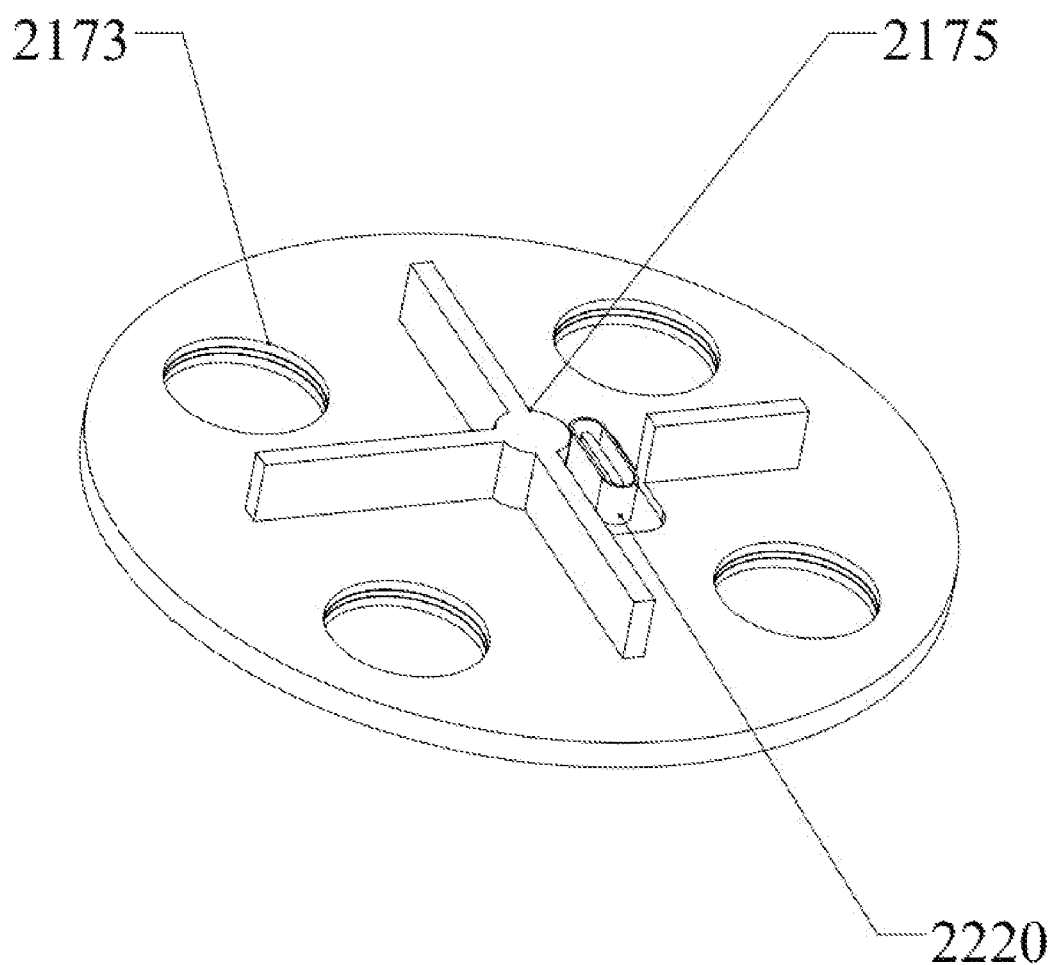
FIG. 11 is a schematic diagram of the circular lamp in this patent application.
Figure 12:
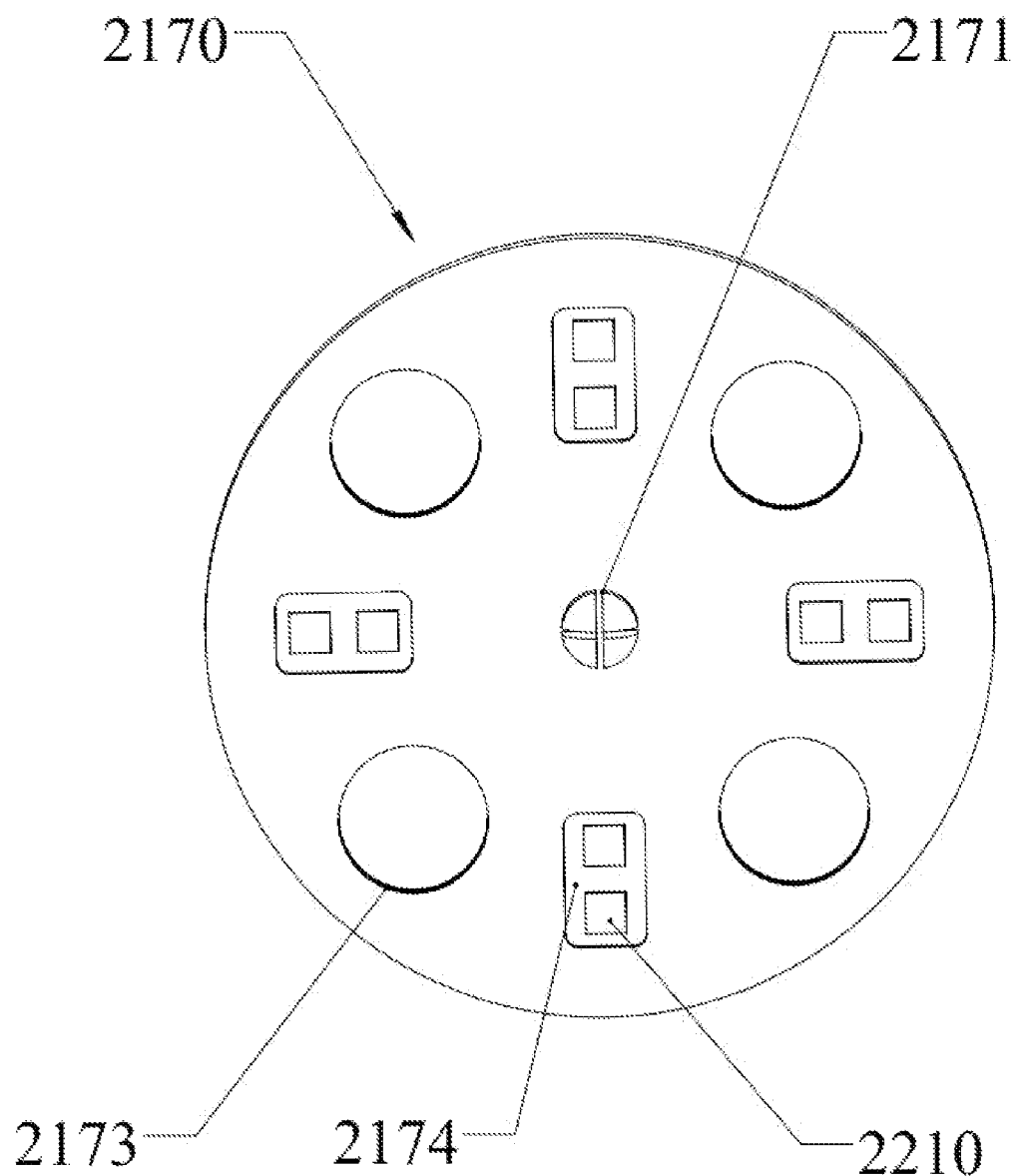
FIG. 12 is a schematic diagram of the circular lamp in this patent application.

Referring to FIG. 9 and FIG. 10, FIG. 9 is the insulation cover 2130 without the plant lamp installed, FIG. 10 is the insulation cover 2130 with the plant lamp installed, both ends of the two tubular mounting seats 2240 are provided with card blocks 2250, the tubular lamp 2230 is fixed in the tubular mounting seat 2240 through the card block 2250, multiple light sources 2210 are linearly set inside the tubular lamp 2230, and one end is provided with a power interface 2260.

Further, the insulation cover 2130 has a lifting part 2162, the planting tray 2100 and the insulation cover 2130 are made of transparent hard material, the light emitted by the plant lamp is imitation sunlight, the light can pass through the planting tray 2100 and the insulation cover 2130, thereby providing imitation sunlight for the plants.

In this embodiment, the imitation sunlight is emitted by LED lights, which can effectively promote plant growth. The absorption of light by plants is mainly through photosynthesis, it can provide the light needed for plant growth under conditions without natural light, such as indoors or at night, thereby promoting the growth and development of plants. In other embodiments, the imitation sunlight can be emitted by other types of lamp groups, such as: fluorescent lamps, or high-pressure sodium lamps (HPS), it can also be metal halide lamps and other lamps.

In this embodiment, no restrictions are made on the materials of the planting tray 2100 and the insulation cover 2130. In other embodiments (not shown in the figure), the materials of the planting tray 2100 and the insulation cover 2130 can be acrylic materials, or organic glass, or polycarbonate, or polystyrene, or ABS and other transparent rigid materials. In other embodiments (not shown in the figure), the materials of the planting tray 2100 and the insulation cover 2130 can be other types of materials, not necessarily transparent rigid materials, as long as they can make the planting tray 2100 and the insulation cover 2130 work normally.

Referring to FIG. 9 to FIG. 13, both circular mounting seats 2160 have a fixed hole 2161 in the center, the circular lamp 2170 includes an outer shell 2172 and a lamp board 2200, the outer shell 2172 and the circular mounting seat 2160 are both provided with four ventilation holes 2173 of the same size and position, providing fresh air for plants through the four ventilation holes 2173.

Further, the circular lamp 2170 has a fixed buckle 2171, the fixed buckle 2171 is located on the outer shell 2172, the circular lamp 2170 is fixed in the fixed hole 2161 through the fixed buckle 2171, providing imitation sunlight for plants.

At the same time, the lamp board 2200 is provided with four groups of light sources 2210, the lamp board 2200 is set inside the outer shell 2172, the outer shell 2172 has an accommodation slot 2174 for placing the light source 2210, the lamp board 2200 extends upwards to have a charging port 2220, the outer shell 2172 has a handle 2175.

In other embodiments (not shown in the figure), the number of light sources 2210 can also be one, or two, or multiple, or other quantity characteristics.

In this preferred embodiment, the measuring device 3000 includes a numerical screen 3200 and a probe 3100, the numerical screen 3200 is connected above the probe 3100, the probe 3100 can measure the temperature and humidity values of the soil, the numerical screen 3200 displays the temperature values and humidity values detected by the probe 3100, the user controls the operation of the heating component 1100 using the control component 1200 based on the temperature values, the temperature control device 1000 is thermally connected with the soil.

In another preferred embodiment (not shown in the figure), the measuring device 3000 includes at least one temperature probe 3100 and at least one humidity probe 3100, the temperature probe 3100 and the humidity probe 3100 extend into the soil of the cultivation chamber 2110 to obtain the temperature values and humidity values of the soil respectively. At the same time, the measuring device 3000 includes a numerical screen 3200, the numerical screen 3200 is connected above the temperature probe 3100 and the humidity probe 3100, the numerical screen 3200 displays the measured temperature values and humidity values.

Further, the temperature control device and the measuring device 3000 can communicate with a remote device and be controlled by the remote device, the user can monitor the soil status of the cultivation chamber 2110 in real time and remotely control the heating component 1100 through the remote device.

In other embodiments (not shown in the figure), the remote device includes but is not limited to mobile phones, such as Apple's iPhone®, other portable electronic devices, such as Apple's iPod Touches®, Apple's iPad®, and mobile devices® operating system based on Google's Android, and any other portable electronic device, including software, firmware, hardware or a combination thereof, at least able to receive signals, decode (if necessary), exchange information with the server to verify information. Typical components of the mobile device may include but are not limited to flash ROM and other permanent memory, SRAM and other random-access memory, camera, battery, LCD driver, display, cellular antenna, speaker, Bluetooth® circuit and WIFI circuit, wherein the permanent memory can contain programs, applications and/or operating systems for the mobile device. The mobile device can be a key card. It can be a key card of a security token, which is a small hardware device with a built-in authentication mechanism. It is used to manage and protect access to network services, data access, provide access, communicate with devices, etc.

In the broad sense of this invention application, the setting of the temperature control device can also be used as a drinking device for animals, by detecting the temperature of the water source, to carry out corresponding heating, can defrost the water source, ensure that the water source does not freeze. At the same time, the new plant cultivation device can be widely used in the following fields, such as: modern agriculture, the device can be used for rapid propagation of plants, variety improvement, genetic engineering breeding, germplasm resource preservation, etc.; education and popular science, the device can be used as a popular science base for primary and secondary school students, or a family micro plant production device can be launched, so that students and families can more intuitively understand the process of plant growth; medicinal resource development: the device can be used for the development of medicinal resources, such as secondary metabolite production, etc.

In summary, the new plant cultivation device provided by this invention application has many advantages: modular design: the various components of the device (such as temperature control device, cultivation component and measuring device) are modular, can be flexibly combined and adjusted according to needs; precise environmental control: through precise control of temperature and humidity, can provide the most suitable growth environment for plants; efficient space utilization: multiple cultivation chambers of the planting tray are arrayed, can greatly improve the utilization rate of space; real-time data monitoring: the probe of the measuring device can obtain the temperature values and humidity values of the soil in real time, help users better understand and control the growth environment of plants; user-friendly operation: users can control the operation of the heating component using the control component based on the real-time temperature values and humidity values, making the operation of the device more simple and intuitive.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A new type of plant cultivation device, comprising a cultivation component and at least one plant lamp; and
    wherein said cultivation component includes a planting tray and an insulation cover, wherein said planting tray has multiple cultivation chambers, multiple said cultivation chambers are arranged in an array, said insulation cover is covered above said planting tray, and encloses and seals said planting tray, wherein said insulation cover also has at least one mounting seat, and said mounting seat can receive and support said at least one plant lamp;
    wherein said mounting seats includes circular mounting seats, said at least one plant lamp includes circular lamp; and
    wherein said circular mounting seats support said circular lamp through a fixed buckle; and
    wherein said at least one plant lamp is configured to provide simulated sunlight for the plants in multiple said cultivation chambers, promoting plant growth.

2. The new type of plant cultivation device according to claim 1, said mounting seats further includes tubular mounting seats, wherein number of said mounting seats is four, wherein said mounting seats are respectively two circular mounting seats and two tubular mounting seats, said at least one plant lamp further includes tubular lamp.

3. The new type of plant cultivation device according to claim 2, wherein a fixed hole is set in the center of two said circular mounting seats, said circular lamp has a fixed buckle, said circular lamp is fixed to said fixed hole through said fixed buckle, providing simulated sunlight for plants.

4. The new type of plant cultivation device according to claim 3, wherein said circular lamp includes an outer shell and a lamp board, both said outer shell and two said circular mounting seats have four ventilation holes of the same size and position, providing fresh air for plants through four said ventilation holes.

5. The new type of plant cultivation device according to claim 4, wherein four groups of light sources are set on said lamp board, said lamp board is set inside said outer shell, said outer shell has an accommodation slot for placing four groups of said light sources, said lamp board extends upward to have a charging port, said outer shell has a handle.

6. The new type of plant cultivation device according to claim 5, wherein a card block is set at both ends of two said tubular mounting seats, said tubular lamp is fixed in said tubular mounting seats through said card block, multiple light sources are linearly set inside said tubular lamp, and a power interface is set at one end of said tubular lamp.

7. The new type of plant cultivation device according to claim 6, wherein a lifting part is on said insulation cover, convenient for user to lift said insulation cover; and both said planting tray and said insulation cover are made of transparent hard material, the light emitted by said at least one plant lamp can pass through said planting tray and said insulation cover, providing simulated sunlight for plants.

8. A new type of plant cultivation device, comprising a temperature control device and a cultivation component; and
    a measuring device, said measuring device is used to obtain the temperature value of the soil; and
    wherein said temperature control device includes a heating component and a control component;
    wherein said control component includes a control switch, said control switch is a button switch, said control switch has a display screen, the temperature value of said heating component can be obtained through said display screen; and
    wherein said cultivation component includes a planting tray and an insulation cover, wherein said planting tray has multiple cultivation chambers, multiple said cultivation chambers are arranged in an array, said insulation cover is covered above said planting tray, and encloses and seals said planting tray, wherein said insulation cover also has at least one ventilation hole, said insulation cover provides fresh air for the plants in multiple said cultivation chambers through said ventilation hole; and wherein user uses said control component to control operation of said heating component, basing on the temperature value of environment; and wherein said temperature control device is thermally connected with said soil in multiple said cultivation chambers; and wherein said heating component is rectangular in structure, wrapped with a layer of waterproof material, said heating component is connected to said control component through at least one wire, said heating component is electrically connected with said control component.

9. The new type of plant cultivation device according to claim 8, said measuring device includes at least one probe, said probe extends into soil of said cultivation chambers to obtain the temperature value and humidity value of said soil; and wherein user uses said control component to control operation of said heating component, basing on said temperature value and said humidity value.

10. A new type of plant cultivation device, comprising a temperature control device, a cultivation component, a measuring device, and at least one plant lamp; and wherein said temperature control device includes a heating component and a control component; and wherein said cultivation component includes a planting tray and an insulation cover, wherein said planting tray has multiple cultivation chambers, multiple said cultivation chambers are arranged in an array, said insulation cover is covered above said planting tray, and encloses and seals said planting tray, wherein said insulation cover also has at least one mounting seat, said mounting seat can receive and support said at least one plant lamp; and wherein said measuring device includes at least one probe, said probe extends into soil of said cultivation chamber to obtain temperature value and humidity value of said soil; and wherein user uses said control component to control operation of said heating component, basing on said temperature value and said humidity value; and wherein said temperature control device is thermally connected with said soil.

11. The new type of plant cultivation device according to claim 10, wherein said cultivation component has a box, said box includes a lower shell and said insulation cover, wherein a bottom of said lower shell is set with multiple anti-slip blocks, multiple said anti-slip blocks are in contact with said heating component, said lower shell and said insulation cover can be disassembled and connected.

12. The new type of plant cultivation device according to claim 11, wherein said lower shell has a protruding part, said protruding part is distributed around said lower shell, the edge of said planting tray bends downwards to form a first cavity, said first cavity and said protruding part are joined, so that said planting tray is accommodated inside said lower shell.

13. The new type of plant cultivation device according to claim 12, wherein said lower shell has an accommodation depth, said accommodation depth is greater than the height of said planting tray, a water-absorbing cotton is set below said planting tray, said water-absorbing cotton is supported by a bracket, said bracket and said lower shell are in contact.

14. The new type of plant cultivation device according to claim 13, wherein the bottom of said lower shell has a recessed hole, said bracket has at least four support legs, at least four said support legs extend downwards and gradually reduce, a shape is adapted to said recessed hole, at least four said support legs are fixed in said recessed hole.

15. The new type of plant cultivation device according to claim 14, wherein multiple said cultivation chambers are arranged in a linear array, the bottom of any one of multiple said cultivation chambers has a drainage hole, excess water can be drained out of multiple said cultivation chambers through said drainage hole.

16. The new type of plant cultivation device according to claim 15, wherein the edge of said insulation cover bends downwards to form a second cavity, the size of said insulation cover is larger than the size of said planting tray, a shape of said first cavity and said second cavity are the same, said first cavity overlaps with said second cavity, so that said insulation cover can be covered above said planting tray.

17. The new type of plant cultivation device according to claim 16, wherein said measuring device includes a numerical screen, said numerical screen is connected above said probe, said numerical screen displays said temperature value and said humidity value detected by said probe, user makes corresponding adjustments according to said temperature value and said humidity value.

18. The new type of plant cultivation device according to claim 17, wherein said temperature control device and said measuring device are both communicated and controlled by a remote device, user can monitor soil status of said cultivation chamber in real time and remotely control said heating component through said remote device.

* * * * *